United States Patent [19]

Widom

[11] Patent Number: 4,675,734
[45] Date of Patent: Jun. 23, 1987

[54] SYNC PULSE SEPARATOR CIRCUIT

[75] Inventor: Steven M. Widom, Brookline, Mass.

[73] Assignee: Polaroid Corporation, Cambridge, Mass.

[21] Appl. No.: 742,055

[22] Filed: Jun. 6, 1985

[51] Int. Cl.⁴ .............................................. H04N 5/08
[52] U.S. Cl. .................................... 358/153; 358/154
[58] Field of Search ............... 358/148, 150, 153, 154, 358/149, 158, 320, 337, 339

[56] References Cited

U.S. PATENT DOCUMENTS

| | | | |
|---|---|---|---|
| 4,051,531 | 9/1977 | Baldwin | 358/140 |
| 4,096,528 | 6/1978 | Tüma et al. | 358/148 |
| 4,148,066 | 4/1979 | Saylor | 358/127 |
| 4,346,407 | 8/1982 | Baer et al. | 358/149 |
| 4,349,839 | 9/1982 | McGinn | 358/148 |
| 4,365,270 | 12/1982 | Rutishauser | 358/140 |
| 4,387,397 | 6/1983 | Dietz | 358/154 |
| 4,402,011 | 8/1983 | Newton | 358/154 |
| 4,425,581 | 1/1984 | Schweppe et al. | 358/148 |
| 4,453,183 | 6/1984 | Balaban et al. | 358/148 |
| 4,471,381 | 9/1984 | Kasuga et al. | 358/140 |
| 4,496,974 | 1/1985 | Heitmann | 358/140 |
| 4,524,387 | 6/1985 | Tamer | 358/154 |

FOREIGN PATENT DOCUMENTS

0786057  12/1980  U.S.S.R. .............................. 358/158

*Primary Examiner*—Tommy P. Chin
*Assistant Examiner*—David E. Harvey
*Attorney, Agent, or Firm*—Edward S. Roman

[57] ABSTRACT

A universal synchronization pulse separator circuit operates to separate the horizontal and vertical synchornization pulse signals from a composite pulse synchronization signal which may have any one of a variety of different formats and frequencies by utilizing a time window discrimination technique which automatically adjusts to the different formats and frequencies that the composite pulse synchronization signal may assume.

24 Claims, 22 Drawing Figures

SYNC PULSE SEPARATOR CIRCUIT

BACKGROUND OF THE INVENTION

1. Field of the Invention

This invention relates generally to a synchronization pulse separator circuit and, more particularly, to a digital synchronization pulse separator circuit for use with a variety of video signal formats.

2. Description of the Prior Art

Video signals are generally unique in the sense that they contain color, brightness and synchronization information all within the same signal in the form of phase, amplitude and pulse width modulation respectively. All the brightness information is generally contained in the positive amplitude of the signal above a predetermined voltage while the horizontal and vertical synchronization signals contained pulses which fall below the predetermined voltage level. Such video signals may be in the well-known RS - 170 type format generally used for commercial broadcasting or alternatively may be in a variety of other formats such as those generated by home and personal computers like DiAnza, Apple, and IBM small computers which do not adhere to the broadcasting industry's format. Video signals are generally processed by first stripping off the brightness information contained in the voltage amplitudes above the predetermined level thereby leaving a composite pulse synchronization signal comprising both horizontal synchronization pulses and vertical synchronization pulses which are then separated from the composite pulse synchronization signal by what are conventionally known as synchronization pulse separator circuits. Such pulse separator circuits are generally designed to accommodate a video signal having a particular format and frequency by selecting particular components involving RC time constant determining elements.

However, not only may the format of the video signal vary as previously discussed, but also the resolution of the line scan may vary particularly for high resolution systems in which the line scan rates may be many times higher than that of basic RS - 170 broadcasting. In addition, even for low resolution systems in which scan rates are relatively lower, various frequencies can be found. For example, in the United States, horizontal frequencies are derived from a 60 hertz field rate, whereas in Europe such frequencies are derived from 50 hertz field rates. Thus, such pulse separator circuits are usually designed to be dedicated to decode only one composite pulse synchronization signal having a specific format and frequency.

Therefore, it is a primary object of this invention to provide a synchronization pulse separator circuit that is automatically compatible for use with various formats and frequencies of video signals.

It is a further object of this invention to provide a synchronization pulse separator circuit for use with video signals of various formats and frequencies without the need for the user to change or adjust either components or other parameters responsive to component adjustments.

It is an even further object of this invention to provide a digital pulse synchronization separator circuit which automatically operates to decode video signals having a variety of different formats and frequencies.

Other objects of the invention will be in part obvious and will in part appear hereinafter. The invention accordingly comprises a mechanism and system possessing the construction, combination of elements and arrangement of parts which are exemplified in the following detailed disclosure.

DESCRIPTION OF THE DRAWINGS

The novel features that are considered characteristic of the invention are set forth with particularity in the appended claims. The invention itself, however, both as to its organization and its method of operation together with other objects and advantages thereof will be best understood from the following description of the illustrated embodiment when read in connection with the accompanying drawings wherein:

FIGS. 4A-4J illustrate various signal levels applicable to the synchronization pulse separator circuit of FIGS. 1-3;

FIGS. 5A-5F show other signals applicable to the synchronization pulse separator circuit of FIGS. 1-3;

SUMMARY OF THE INVENTION

A digital synchronization pulse separator circuit is provided for separating a horizontal pulse synchronization signal and a vertical pulse synchronization signal from a composite pulse synchronization signal of the type which comprises both horizontal and vertical synchronization pulses which define a vertical blanking period. The synchronization pulse separator circuit comprises means for determining the number of clock pulses from a clock pulse train that occur between two succeeding horizontal synchronization pulses of the composite pulse synchronization signal. Means are provided for comparing the determined number of clock pulses with the actual number of clock pulses occurring between succeeding synchronization pulses of the composite pulse synchronization signal to provide a horizontal pulse train and at least one signal defining the vertical blanking interval. Means are provided for thereafter gating the horizontal pulse train with the vertical blanking interval signal to provide a signal determinative of the horizontal pulse synchronization signal. Means are provided for determining the number of horizontal pulses of the horizontal pulse train that occur between two succeeding vertical blanking intervals of the vertical blanking interval signal. Means thereafter operate to compare the determined number of horizontal pulses with the actual number of horizontal pulses of the horizontal pulse train occurring between succeeding vertical blanking intervals to provide a signal determinative of the vertical pulse synchronization signal.

DESCRIPTION OF THE PREFERRED EMBODIMENT

Figures 4A, 4B:
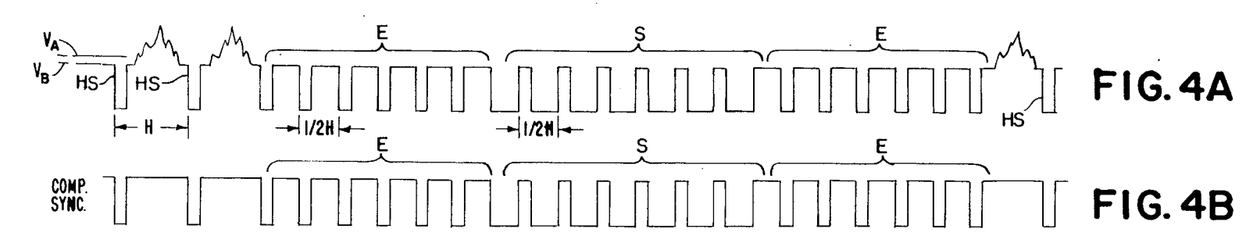

Referring now to FIG. 4A there is shown a typical video signal comprising color brightness and synchronization information all contained within the same signal in the form of phase, amplitude and pulse width modulation, respectively. All the brightness information is contained in the amplitude of the video signal above the voltage $V_a$ with the more positive voltages corresponding to the whiter picture areas. The voltage level $V_b$ corresponds to the blanking level below which no brightness information is provided and which is sometimes referred to as the "blacker than black" level. The video signal provides for blanking so that the electron beam cannot be seen on the surface of a cathode ray tube during the intervals in which it is retraced.

The negative transitions of the video signal below the voltage level $V_b$ provide the horizontal synchronization pulses HS, the pulse width of which defines each horizontal blanking interval. The horizontal line scan frequency is determined from the negative transition of a horizontal synchronization pulse HS to the negative transition of the next succeeding horizontal synchronization pulse HS. This interval defines a period H which for commercial broadcasting is generally in the order of 63.5 microseconds. The voltage levels between the highest brightness amplitude and the lowest level of the horizontal synchronization pulses HS is generally divided into 140 "IRE" components such that the negative amplitude of the horizontal synchronization pulses HS equals 40% of the voltage difference between the voltage level $V_b$ and the voltage level defining the brightest amplitude. Typically, the voltage difference between the voltage levels $V_a$ and $V_b$ is 7.5 "IRE" units. Thus, for example, if the voltage level $V_b$ were ground, and the whitest voltage level were selected to be 1 volt, then the tip of the horizontal synchronization pulse HS would be $-0.4$ volts and the reference black level voltage, $V_a$ would be 75 millivolts.

Although the greatest difference in voltage levels may be fixed at 140 "IRE" units, the DC offset can vary significantly from trace to trace. Since this drift can cause corresponding variations in brightness on the CRT, it is necessary to clamp the voltage level $V_a$ to a predetermined fixed voltage level. This may be achieved by clamping the voltage level $V_b$ to a fixed voltage level near ground during the occurrence of each back porch in the video signal. Such clamping is commonly referred to as DC restoration.

After the electron beam travels from the top to the bottom of the CRT, there must be provided a vertical retrace signal to return the electron beam back to the top of the CRT. As in the case of the horizontal retrace, the video signal must also be blanked during the vertical retrace so that it cannot be observed. Toward this end a vertical blanking interval is defined by a plurality of serration synchronization pulses S having a substantially greater pulse width than that of the horizontal synchronization pulses HS. The serration synchronization pulses S have a period of one-half H and are preceded and succeeded by intervals of equalization pulses E that also have a period of one-half H and further define the vertical blanking interval.

The video signal A is in EIA standard RS - 170 format and is stripped of its brightness amplitude information by conventional "stripper" circuits to provide a composite pulse synchronization signal as shown in FIG. 4B. The resulting composite pulse synchronization signal contains all the synchronization information minus the brightness amplitude information thereby eliminating any possibility that such transition from a white amplitude level to a black amplitude level would be confused with a negative going synchronization pulse.

Figure 1:
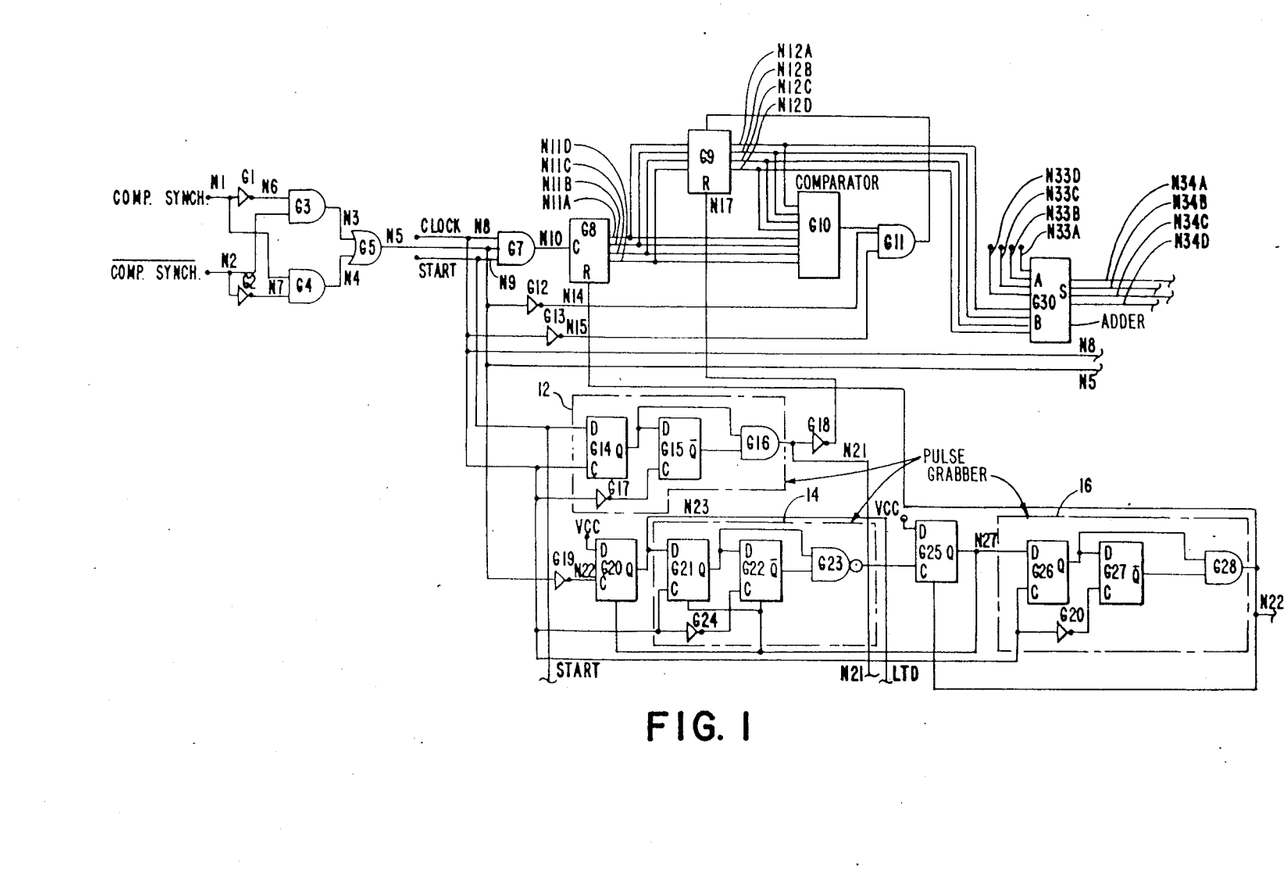
FIG. 1 is a schematic circuit diagram of a portion of the synchronization pulse separator circuit of this invention.
Figure 2:
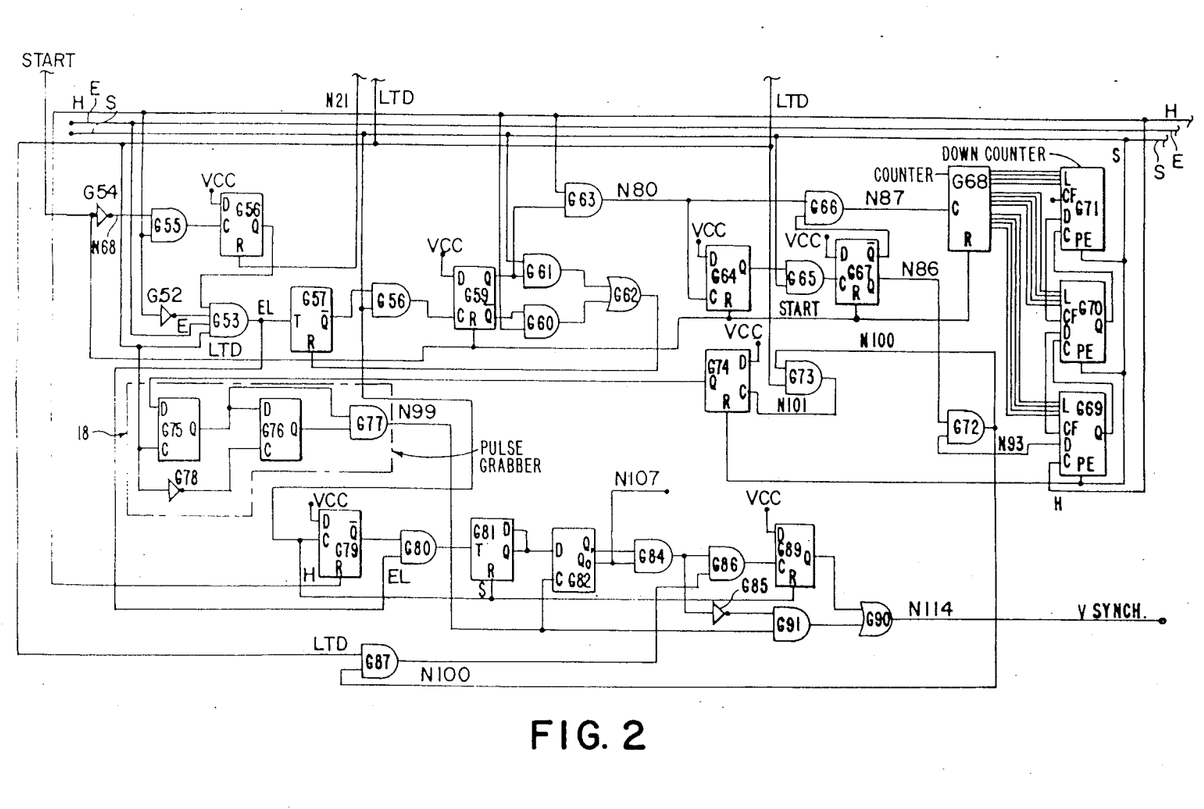
FIG. 2 is a schematic circuit diagram of another portion of the synchronization pulse separator circuit of this invention.
Figure 3:
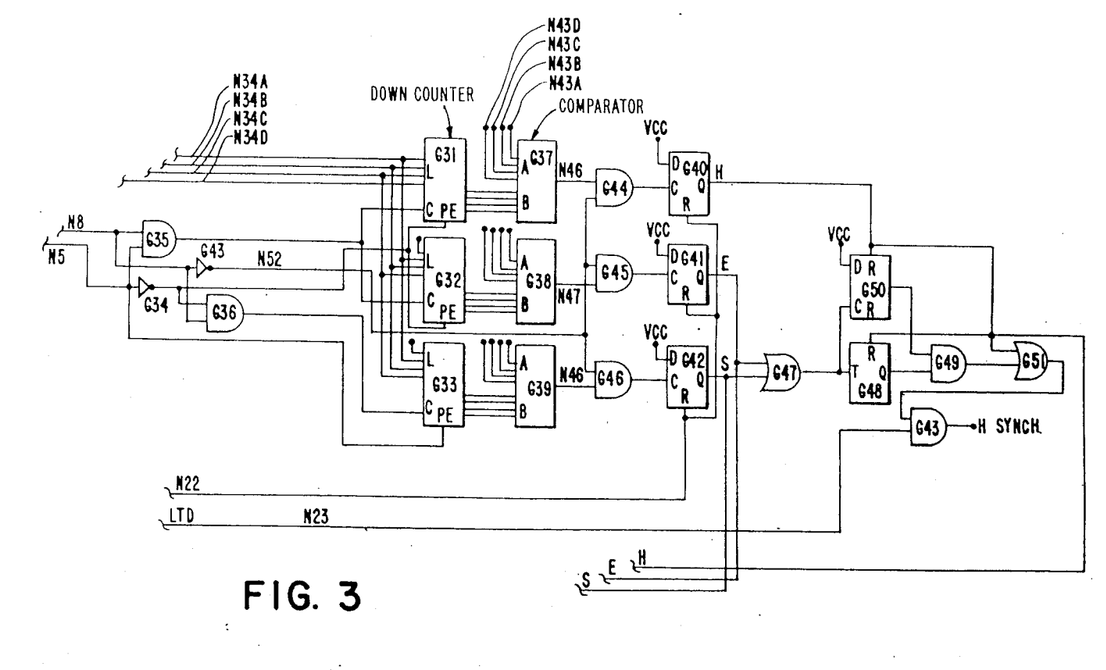
FIG. 3 is a circuit diagram of still another portion of the synchronization pulse separator circuit of this invention.

Referring now to the schematic diagrams of FIGS. 1-3, there is shown the pulse separator circuit of this invention in which the composite pulse synchronization signal of FIG. 4B is applied to node N1 of the circuit of FIG. 1. As previously discussed, the composite pulse synchronization signal applied to node N1 is derived from a conventional "stripper" type circuit in which the amplitude video information is clipped off the incoming signal. As is well known, some video signals provide a composite pulse synchronization signal with a positive synchronization pulse tip format as opposed to the negative pulse synchronization tip format of the signal of FIG. 4B. Since the pulse separator circuit of this invention must accommodate both types of formats, there are provided AND gates G3 and G4 having outputs connected to an OR gate G5. One input to the AND gate G3 is derived from the input node N1 by way of an inverter G1, and the other input to the AND gate G3 is derived from another input node N2. One input terminal to the AND gate G4 connects to the input node N1 while the other input terminal to the AND gate G4 connects to the input node N2 by way of another inverter G2.

When the input composite pulse synchronization signal is of the negative format as shown in FIG. 4B, the synchronization pulse tips are referenced to a low (binary logic 0) signal level and the intervals between synchronization pulses are referenced to a high (binary logic 1) signal level. The voltage level at input node N2 is then set to a low (binary logic 0) signal level so as to be inverted by the inverter G2 and thereby enable the AND gate G4 to gate through the composite pulse synchronization signal of FIG. 4B. Conversely, if the input composite pulse synchronization signal is of the aforementioned positive format with the synchronization pulse tips referenced to a high (binary logic 1) signal level and the intervals between synchronization pulses referenced to a low (binary logic 0) signal level, then the voltage level at node N2 is set to a high (binary logic 1) signal level so as to enable AND gate G3 to gate through the inverted composite pulse synchronization signal.

The output composite pulse synchronization signal from either AND gate G3 or AND gate G4 is thereafter gated by an OR gate G5 to a first input terminal node N5 of an AND gate G7. A second input terminal node N8 to the AND gate G7 receives a clock pulse train signal as shown in FIG. 4E, and a third input terminal node N9 to AND gate G7 receives a start pulse as shown in FIG. 4D which is set to a high (binary logic 1) signal level. The start pulse extends for a duration of time at least equal to the vertical blanking interval of the composite pulse synchronization signal as defined by the equalization and serration pulses plus the interval of one horizontal line scan H. The AND gate G7 gates through the clock pulse train signal of FIG. 4E in intervals corresponding to the intervals between the synchronization pulses of the composite clock pulse train signal of FIG. 4B.

The output clock pulses from the AND gate G7 are thereafter counted up by an up counter G8 which, in turn, provides an output count at nodes N11A through N11D. The output count at nodes N11A through N11D thus represents the number of clock pulses that occur between synchronization pulses of the composite pulse synchronization signal of FIG. 4B. The output count from the up counter G8 is thereafter directed to a data latch G9 which, in turn, provides an output at nodes N12A through N12D which is directed to input a digital comparator G10. The output from the up counter G8 at nodes N11A through N11D is also directed to the digital comparator G10 which operates to compare the number of clock pulses latched by the data latch G9 with the number of clock pulses counted by the up counter G8 between the next succeeding pair of synchronization pulses of the composite clock pulse synchronization signal. If the number of clock pulses counted by the up counter G8 during the next succeeding interval between synchronization pulses is greater than the number of clock pulses latched by the data latch G9 and counted in the immediately preceding interval between synchronization pulses, then the comparator G10 provides a high (binary logic 1) signal level output to an AND gate G11.

Figure 4C:
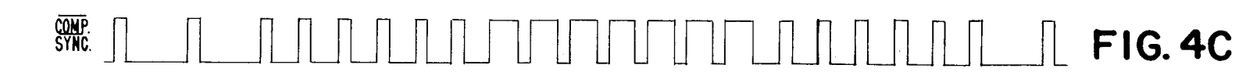
Figure 4D:
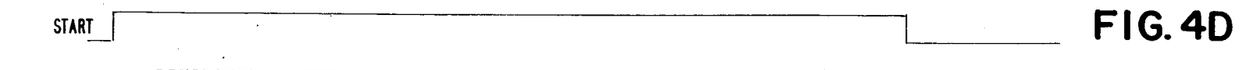
Figures 4E, 4F:
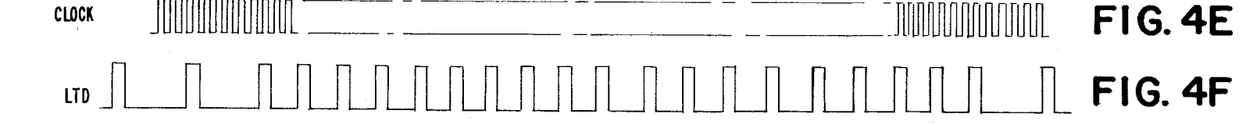

A second input terminal at node N14 to the AND gate G11 receives an inverted composite pulse synchronization signal as shown in FIG. 4C from node N5 by way of an inverter G12. A third input terminal at node N15 to the AND gate G11 receives an inverted clock pulse train from node N8 by way of another inverter G13. Thus, the inverted clock pulse train and composite pulse synchronization signal operate to gate through the output signal from the comparator G10 during the low portions of the composite pulse synchronization signal so as to signal the data latch G9 to latch in the pulse count from the up counter G8 when it exceeds the preceding pulse count latched in the data latch G9. In this manner, the pulse count latched in the data latch G9 is continuously updated to reflect the highest pulse count between synchronization pulses which as is readily apparent occurs between the horizontal synchronization pulses HS which have a period twice the period of the equalization and serration synchronizaton pulses. Thus, after a sufficiently long time as determined by the width of the start pulse of FIG. 4D, the data latch G9 contains a clock pulse count corresponding to the interval between horizontal synchronization pulses HS.

The aforementioned circuit, however, will be ineffective if, at the time when it initially is powered up, the data latch G9 contains an output pulse count greater than the output pulse count which could occur between succeeding horizontal synchronization pulses HS. The possibility of this situation occurring is overcome by applying a reset signal at node N17 to the data latch G9 upon the application of the start signal of FIG. 4D so as to reset the data latch G9 so that the output at nodes N12A through N12D assume low (binary logic 0) signal levels. Toward this end there is provided a pulse grabber circuit as shown generally at 12 comprising a pair of D flip-flops G14, G15, an AND gate G16, and an inverter G17. The D terminal of the flip-flop G14 is connected to receive the start pulse while the C input terminal is connected to receive the clock pulse train at node N8. Thus, after the start pulse assumes a high (binary logic 1) signal level, the next positive transition of the clock pulse train will operate to latch the Q output terminal of the flip-flop G14 to provide a high (binary logic 1) output signal level which connects to the D input terminal of the flip-flop G15 and an input terminal of the AND gate G16. Since the $\bar{Q}$ output terminal of the flip-flop G15 is already at a high (binary logic 1) signal level, the AND gate 16 will thereafter switch to provide a high (binary logic 1) signal level at node N21 which is subsequently inverted by an inverter G18 to provide the leading edge of the reset pulse to the data latch G9. The next succeeding falling edge of the clock pulse train will be inverted by the inverter G17 to provide a rising edge to the C input terminal of the flip-flop G15 so as to latch the flip-flop G15 thereby causing the output at terminal $\bar{Q}$ to decrease to a low (binary logic 0) signal level. Since the flip-flop G15 has no means of being reset, this series of events cannot reoccur and only one clock pulse can occur at the output node N21 of the AND gate G16. This pulse is inverted by the inverter G18 to provide the required reset pulse to the data latch G9.

Not only must the data latch G9 be reset upon initialization of the start pulse but the up counter G8 must also be reset during the low synchronization pulse portions of the composite pulse synchronization signal so that a new count will be started on each rising edge of the intervals between synchronization pulses of the composite pulse synchronization signal. The resetting of the up counter G9, however, must allow for sufficient time in the order of tens of nanoseconds for the data to be loaded and settled in the data latch G9. Toward this end two pulse grabbing circuits as shown generally at 14 and 16 are provided.

The pulse grabber circuit 14 comprises two D flip-flops G21, G22, a NAND gate G23 and an inverter G24. The pulse grabber circuit 16 comprises two D flip-flops G26 and G27, an AND gate G28, and an inverter G20. The input signal to the pulse grabber circuit 14 is provided by way of a D type flip-flop G20 and an inverter gate G19. The D input terminal to the flip-flop G20 is connected to a DC voltage supply VCC and latched by the falling edge of the composite pulse synchronization signal which is inverted by the inverter G19. Thus, a high (binary logic 1) signal level at the Q output terminal of the flip-flop G20 corresponds to a falling transition or leading edge of a synchronization pulse of the composite pulse synchronization signal of FIG. 4B. This rising edge at node N23 provides a high (binary logic 1) signal level to the D terminal of the flip-flop G21 thereby enabling the flip-flop G21 to be latched upon the next rising edge of a clock pulse in the clock pulse train of FIG. 4E. Latching the flip-flop G21, in turn, causes the output at the Q terminal thereof to rise to a high (binary logic 1) signal level which is thereafter directed to one input terminal of the NAND gate 23. The falling edge of the same clock pulse that latched the flip-flop G21 is inverted by the inverter G24 to provide a rising edge that latches the flip-flop G22 so as to cause the output at the $\bar{Q}$ terminal thereof to fall to a low (binary logic 0) signal level thereby causing the output from the NAND gate 23 to rise to a high (binary logic 1) signal level and latch the flip-flop G25 so as to provide a high (binary logic 1) signal level at the output Q terminal thereof and consequently reset flip-flops G20 and G22.

This provides a pulse of high (binary logic 1) signal level at node N23 having a duration greater than the width of one clock pulse but less than the width of two clock pulses depending upon the actual phase relationship between the composite pulse synchronization signal and the clock pulse train at the time the flip-flop G20 is first latched. This signal is hereinafter referred to as a low transition detector pulse train (LTD) and is illustrated in FIG. 4E. The important feature of the low transition detector pulse train (LTD) is that the rising edge of each pulse aligns directly with the falling edge of each synchronization pulse of the composite pulse synchronization signal within a few nanoseconds of propagation delay through the flip-flop G20. As previously discussed, the pulse width of each low transition detector pulse must be sufficiently long to allow for the loading and settling of the data latch G9 thereby limiting the upper frequency of the clock pulse train.

The falling edge of the low transition detector pulse (LTD) which occurs upon the latching of the flip-flop G25 also operates to enable the pulse grabber 16 by providing a high (binary logic 1) signal level to the input terminal D of the flip-flop G26. The next succeeding rising edge of a clock pulse applied to the input terminal C of the flip-flop G26 operates to latch the flip-flop G26 to provide a high (binary logic 1) signal level at the output Q terminal thereof. Its output signal, in turn, is directed to one input terminal of the AND gate G28 of which the other terminal is already at a high (binary logic 1) signal level by virtue of the $\overline{Q}$ output terminal of the flip-flop G27. Thus, the AND gate G28 is switched to provide a high (binary logic 1) signal level which operates to reset the up counter G8. The falling edge of the clock pulse that set the latch G26 is inverted by the inverter G20 to provide a rising edge which operates to latch the flip-flop G27 and thereby switch the output at the $\overline{Q}$ terminal thereof to a low (binary logic 0) signal level thereby terminating the reset pulse to the up counter G8. The flip-flop circuits G26 and G27 do not require resetting inputs since they automatically attain a reset state one clock pulse after the flip-flop G25 is reset.

Figure 5A:
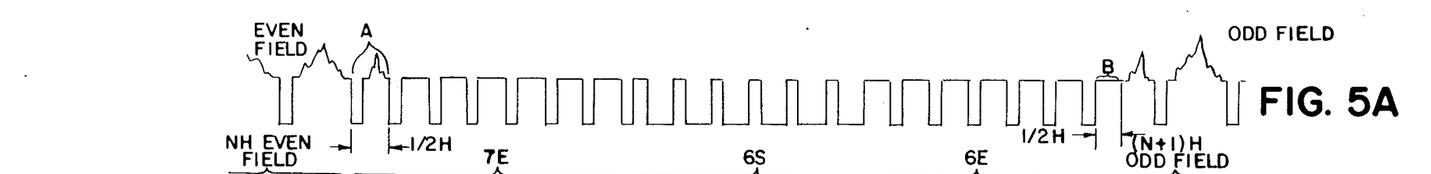
Figure 5B:
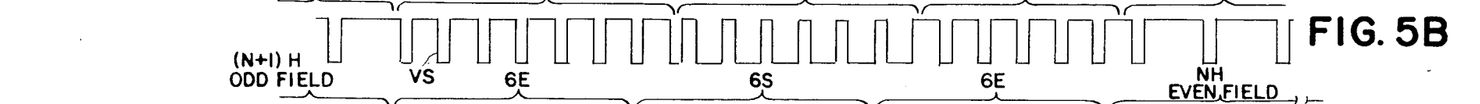
Figure 5C:
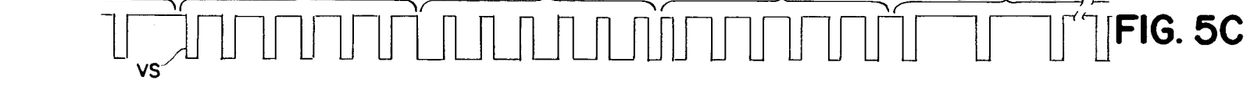
Figures 5D, 5E:
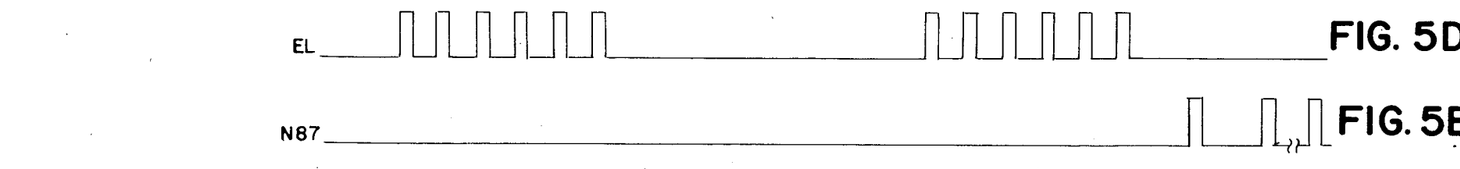
Figures 5F, 6A:
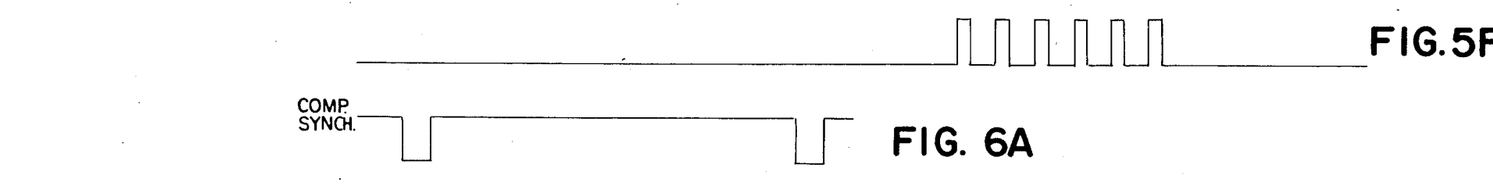
FIGS. 6A and 6B show two signals also applicable to the synchronization pulse separator circuit of FIGS. 1-3.
Figure 6B:
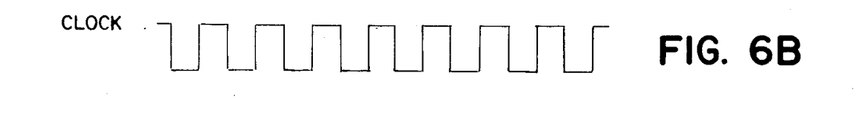

Since the clock pulses of the clock pulse train of FIG. 4E have an arbitrary phase relationship with respect to the synchronization pulses of the composite pulse synchronization signal of FIG. 4B, it is possible that the final pulse count stored in the data latch G9 is one pulse count short of the value at which it should actually be. As an example, reference is made to the composite pulse synchronization signal and clock pulse train as shown in FIGS. 6A and 6B wherein the interval between succeeding synchronization pulses of a composite pulse synchronization signal is very nearly seven clock pulses in duration but due to the phase difference will be detected by the counter G9 as having only six rising edges and thus only six clock pulse counts. For this example, there is a substantial error of one part in seven or nearly 15%. As is readily apparent the higher the clock frequency, the less the error becomes; however, this results in increasing the number of bits at the output of the up counter G8 thereby providing further difficulty in the layout of an integrated circuit equivalent. In addition, it can be seen that the clock pulse counts between equalization and serration synchronization pulses can be calculated by dividing the clock pulse count stored in the data latch G9 by two which is accomplished in binary format by shifting the binary number to the right and dropping the least significant bit. In a situation where the binary clock pulse count is odd, then the least significant binary digit is at a high (binary logic 1) signal level and the aforementioned shift right operation produces an additional error of one-half a clock pulse count. Again, as is readily apparent, this error decreases as the frequency of the clock pulse train increases. An adder G30 solves this difficulty by adding an artificial offset which in practice can be zero provided at nodes N33A through N33D to the input pulse count from the data latch G9.

The output pulse count from the adder G30 at nodes N34A through N34D is directed to the parallel load input of a down counter G31 as shown in FIG. 3. Those input lines corresponding to the higher order binary bits of the pulse count are directed to inputs respectively of a pair of down counters G32 and G33 corresponding to the lower order binary bits. This effectively provides the binary shift right operation that realizes a division by two accurate to one-half a clock pulse in binary format.

The output clock pulse count signals from the down counters G31, G32 and G33 are directed respectively to the B terminals of comparators G37, G38 and G39. The A input terminals of the comparators G37, G38 and G39 are set respectively to predetermined binary counts as shown for example at the input nodes N43A through N43D of the comparator G37. The composite pulse synchronization signal at node N8 and the clock pulse train at node N5 are directed to respective input terminals of an AND gate G35 which provides an output to clock down the down counters G31 and G32. The composite pulse synchronization signal, in turn, is inverted by an inverter G34 and directed together with the clock pulse train at node N8 to respective input terminals of an AND gate G36, the output of which operates to clock down the down counter G33. In this manner the counters G31 and G32 count down the clock pulses from the clock pulse train during the high intervals of the composite pulse synchronization signal between the synchronization pulses.

Since the composite pulse synchronization signal is inverted by the inverter G34, the down counter G33 operates to count down the clock pulses during the low periods of the composite pulse synchronization signal which exist either at the tips of the synchronization pulses or the periods between the serration synchronization pulses. Since the duration of each synchronization pulse is brief in comparison to the low voltage level intervals between the serration pulses, it is readily apparent that the counter G33 only counts down to the predetermined clock pulse count inputted at A to the comparator 39 during the intervals between serration pulses. Thus, the counter G31 counts down the clock pulses during the high signal levels between the synchronization pulses of the composite pulse synchronization signal to provide an output clock pulse count at the input B of the comparator 37 equivalent to the predetermined pulse count provided at the input terminal A at the end of each horizontal line scan interval. In like manner, the down counter 32 provides an output pulse count to the input B of the comparator G38 equivalent to the predetermined pulse count provided at input terminal A at the end of each interval between synchronization pulses regardless of whether the synchronization pulses are horizontal or equalization type pulses.

The output signals from the comparators G37, G38 and G39 at nodes N46, N47 and N48 respectively are directed respectively to input terminals of AND gates G44, G45 and G46. The other input terminals to the AND gates G44, G45 and G46 are gated by an inverted clock pulse train by way of an inverter G43. The outputs from the AND gates G44, G45 and G46, in turn, are directed respectively to latch D flip-flops G40, G41 and G42 which are enabled by having their D input terminals connected to the positive voltage supply VCC. The flip-flops G40, G41 and G42 operate to latch the output signals from the comparators G37, G38 and G39 respectively during the synchronization pulses of the composite pulse synchronization signal which is also the time when the down counters G31, G32 and G33 are reloaded. The AND gates G44, G45 and G46 operate to latch the flip-flops G40, G41 and G42 respectively only on the falling edges of the clock pulses of the clock pulse train to prevent a false premature setting of the latches G40, G41 and G42 as a result of any transient states which might appear at the output terminals of the comparators G37, G38 and G39 as the counters G31, G32 and G33 count down.

Figure 4G:
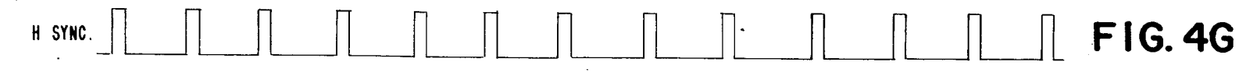
Figure 4H:
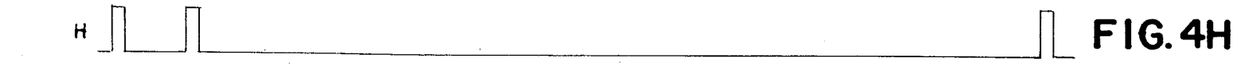
Figure 4I:
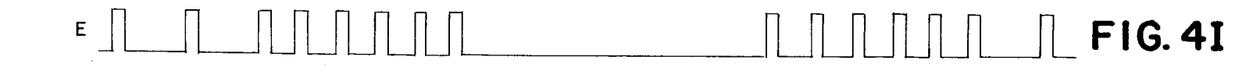
Figure 4J:
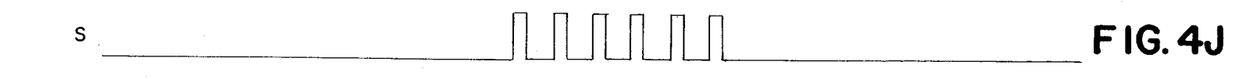

The output terminals Q of the flip-flops G40, G41 and G42 provide respectively a horizontal pulse train signal H as shown in FIG. 4H, an equalization pulse train signal as shown at FIG. 4I and a serration pulse train signal S as shown at FIG. 4J. The latches G40, G41 and G42 are reset by the output signal at node N22 from the aforementioned pulse grabber circuit 16. This reset signal ensures that the latches G40, G41 and G42 are not reset until the rising edge of the succeeding clock pulse after the low transition detector pulse (LTD) thereby ensuring that the horizontal pulse train H, the equalization pulse train E, and the serration pulse train S, are maintained for the duration of the horizontal synchronization pulse.

The down counters G31, G32 and G33 in concert with the comparators G37, G38 and G39 provide a time window discrimination in which the clock pulses of the horizontal clock pulse train occurring between the synchronization pulses of the composite pulse synchronization signal are compared to predetermined values to discriminate whether the synchronization pulses are horizontal synchronization pulses, equalization synchronization pulses or serration synchronization pulses. The input reference binary pulse counts to the A inputs of the comparators 37, 38 and 39 may be set at 0 or alternatively at some predetermined level so that the output signals from the comparators can switch slightly prematurely in anticipation of the time required to set the flip-flop latches 40, 41 and 42.

The equalization pulse train E and the serration pulse train S are directed to respective input terminals of an OR gate 47 from which the output is connected to an input terminal of a toggle flip-flop G48. The output signal from the toggle flip-flop G48 is reset to a low (binary logic 0) signal level with the horizontal pulse train H which as is readily apparent never appears during the vertical blanking interval. In order to prevent the toggle flip-flop G48 from providing an output during intervals outside the vertical blanking period which could occur as a result of the equalization pulse train E providing pulses coincident with the pulses of the horizontal pulse train, there is provided an AND gate G49 and another latch G50 which is enabled by connecting its D terminal to the voltage supply VCC. The output from the latch G50 rises to a high (binary logic 1) signal level upon being latched by the rising edge of a pulse from either the horizontal pulse train H or the equalization pulse train E at the output of OR gate G47. The latch G60, however, is reset by each pulse of the horizontal pulse train H so that during the reset periods, the output of the toggle flip-flop G48 is not gated through AND gate G49. The output from the AND gate G49, in turn, is directed together with the horizontal pulse train H to respective input terminals of an OR gate G51 which, in turn, provides an output to one input terminal of an AND gate G43. The other input terminal to the AND gate G43 receives the low transition detector pulse train LTD at node N23 to provide the horizontal synchronization pulse train as shown at FIG. 4G. Thus, as is readily apparent, the horizontal pulse synchronization signal of FIG. 4G has rising edges which align with the falling edges of the composite pulse synchronization signal within propagation delays through the flip-flop G20 and the AND gate G43. The pulse widths of the horizontal pulse synchronization signal are between one and two clock cycles and occur with a constant period of H.

The electron beam of a CRT may be scanned in either a non-interlace mode or interlace mode of operation. In the conventional interlace mode, each video frame is divided into two fields with the odd lines being scanned in the first field in 1/60th of a second and the even lines being scanned in the next succeeding field in 1/60th of a second. Interlacing reduces the bandwidth necessary for the system as well as the power dissipated but, however, complicates the synchronization pulses that must be transmitted. In the non-interlace mode of operation as will be well understood, the electron beam merely writes over its previous trace. Referring now to FIG. 5A there is shown a typical video signal for the vertical blanking interval prior to the odd field in which one-half a horizontal line scan of amplitude information has been added as shown at A to the end of one field and one-half a horizontal line scan of video amplitude information has been deleted as shown at B from the beginning of the next field resulting in a net odd integer of horizontal line scans while changing nothing in the next succeeding vertical blanking period. After the video amplitude information has been stripped in the aforementioned manner from the video signal of FIG. 5A, there is provided a composite pulse synchronization signal as shown at FIG. 5B. Since the video amplitude information from the added one-half horizontal line scan as shown at A in FIG. 5A is stripped to define the composite pulse synchronization signal of FIG. 5B, it merely appears that an additional equalization pulse has been provided resulting in an odd number of equalization pulses in the intervals during the vertical blanking period preceding an odd field. Thus, once the video amplitude information has been stripped from the video signal as shown at FIG. 5A, the one-half horizontal line scan A at the end of the even field and appearing before the beginning of the odd field vertical blanking period is indistinguishable from an equalization pulse. In addition, the odd field has one more fully scanned horizontal line than the even field and a determination can be made as to whether the next succeeding field is even or odd by determining whether there is an even or odd number of equalization pulses in the immediately preceding vertical blanking period.

The vertical pulse synchronization signal is derived by first determining the legitimate number of equalization pulses from the equalization pulse train E of FIG. 4I. The legitimate equalization pulses are those pulses that do not coincide with horizontal pulses of the horizontal pulse train H of FIG. 4H. Toward this end an AND gate G53 as shown in FIG. 2 receives an inverted horizontal pulse train $\overline{H}$ by way of an inverter G52, the equalization pulse train E and the low transition detector pulse train LTD. In this manner, those pulses of the equalization pulse train E that coincide with the pulses of the horizontal pulse train H are prohibited from being gated through the AND gate 53 thereby providing the legitimate equalization pulse train EL of FIG. 5D. A D flip-flop G56 having its D terminal connected to a positive supply VCC provides an output at the Q terminal thereof to another input terminal of the AND gate 53. The flip-flop G56 is clocked by an output from an AND gate G55 having one input terminal connected to receive the horizontal pulse train H and the other input terminal connected to receive an inverted start signal by way of an inverter G54. The horizontal pulse train H gated with the inverted start pulse in this manner through the AND gate G55 ensures that any transients which might appear on the horizontal pulse train H during the beginning of the start pulse will not operate to falsely set the flip-flop G56. In addition, in order to avoid any power up transients, the flip-flop G56 is reset by the output pulse from the pulse grabber circuit 12 by tying the output of the pulse grabber 12 at node N21 to the reset input of the flip-flop G56. In this manner, complete groups of equalization pulses always appear at the output of AND gate G53.

Since the exact number of equalization of pulses which occur during a blanking interval are not of significance, but only whether the number of equalization pulses in an interval are even or odd, the output of the AND gate G53 is connected to the input terminal of a toggle flip-flop G57 whose output $\bar{Q}$ assumes a high (binary logic 1) signal level only when the number of equalization pulses is even. The output from the flip-flop 57 is gated in conjunction with the serration pulse train S through an AND gate G56 in order to ensure that a complete interval of equalization pulses is considered. The output from the AND gate G56 is directed to set a D flip-flop G59 whose D terminal is connected to the positive voltage supply VCC. In the situation where the number of equalization pulses is odd the output from the $\bar{Q}$ terminal of the flip-flop G59 remains at a high (binary logic 1) signal level so as to enable an AND gate G60 to gate through the next occurrence of a horizontal pulse from the horizontal pulse train H. The output from the AND gate G60, in turn, is gated through an OR gate G62 to provide an output which, in turn, is directed to reset the flip-flop G57. The aforementioned sequence thereafter repeats itself during the next vertical blanking period. However, when the number of equalization pulses in an interval is even, the flip-flop G59 is latched so that the Q output terminal thereof assumes a high (binary logic 1) signal level. The next occurrence of a serration pulse of the serration pulse train S is gated with the output from the Q terminal of the flip-flop G59 through an AND gate G61 and thereafter through the OR gate G62 to reset the flip-flop G57 as previously discussed. However, once the flip-flop G59 is set, it will not be reset since its reset line is tied to receive the start pulse which is a single occurring pulse. Thus, at this time, the horizontal pulses of the horizontal pulse train H are enabled to pass through an AND gate G63. In this manner it is guaranteed that only the horizontal pulses of the horizontal pulse train H that pertain to an even field as shown in FIG. 5E will be gated for subsequent counting in the manner of this invention to be subsequently described.

The even horizontal pulses of the horizontal pulse train H are directed to one input terminal of an AND gate G66, and to the C terminal of a D flip-flop G64 which has its D input terminal connected to the voltage supply VCC. The Q output from the flip-flop G64, in turn, is connected to one input terminal of an AND gate G65, the other input terminal of which is connected to receive the serration pulse train S. The output from the AND gate G65, in turn, is connected to set a D flip-flop G67 which also has its D terminal connected to the voltage supply VCC. The $\bar{Q}$ output terminal of the flip-flop G67 is connected to the other input terminal of the AND gate G66. The output terminal $\bar{Q}$ of the flip-flop G67 initially assumes a high (binary logic 1) signal level so as to enable the AND gate G66 to gate through the horizontal pulses of the horizontal pulse train H to an up counter as shown at G68. The first occurrence of a horizontal pulse from the horizontal pulse train H at node N80 will operate to set the flip-flop G64 so as to cause the Q output terminal thereof to assume a high (binary logic 1) signal level. This high (binary logic 1) signal level, in turn, enables the AND gate G65 to switch upon the next occurrence of a serration pulse from the serration pulse train which will occur during the vertical blanking period following the even field. The next serration pulse thus will cause the output from the AND gate G65 to assume a high (binary logic 1) signal level thereby setting the flip-flop G67 so as to provide a low (binary logic 0) signal level at the $\bar{Q}$ output terminal thereof thereby, in turn, disabling the AND gate G66 from further gating through the horizontal pulses of the horizontal pulse train H. In order to ensure that the logic gates are still in the proper states upon power up, it can be seen that flip-flops G64 and G67 and counter G68 are reset by the start pulse. Since the flip-flops G64 and G67 cannot be reset again, it is assured that the counter G68 will count only once the number of horizontal pulses of the horizontal pulse train H in an even field.

The output lines of the up counter G68 are tied to the input load lines of a down counter chain as shown at G69, G70 and G71. As is readily apparent, the down counters G69 through G71 are loaded during the vertical blanking interval as a result of the PE inputs thereto being connected to receive the serration pulses of the serration pulse train S. In this manner it is ensured that the down counters G69 through G71 will commence counting down after the first horizontal pulse of the horizontal pulse train H for every field. The output from the down counter chain G69 through G71 is a single pulse provided at node N93 indicating that the count has reached a substantially zero state. As is readily apparent, the down counters G69 through G71 count down the horizontal pulses of the horizontal pulse train applied to the C input terminals thereof. The output at node N93 from the last counter G69 of the down counter chain is directed to one input terminal of an AND gate G72, the other input of which connects to receive the Q terminal output at node N86 from the flip-flop G67. In this manner the input node N86 to the AND gate G72 will assume a high (binary logic 1) signal level only after the up counter G68 has completed its counting operation thus preventing transients from occurring at the output node N100 prior to that time.

The output from the AND gate G72 is gated through an AND gate G73 in conjunction with the low transition detector pulse train LTD in order to set a D flip-flop G74 having its D input terminal connected to the voltage supply VCC. The output from the Q terminal of the flip-flop G74, in turn, is directed to another pulse grabber circuit as shown generally at 18 comprising D flip-flops G75, G76, AND gate G77 and inverter G78. The pulse grabber circuit 18 is clocked from the low transition detector pulse train LTD to provide an output pulse at node N99 upon the next falling edge of the composite pulse synchronization signal after an even number of horizontal pulses has been counted.

This output could serve as a perfectly adequate vertical synchronization pulse signal for the interlaced mode of operation since the vertical synchronization pulses correspond to the first falling edge of a synchronization pulse of the composite pulse synchronization signal after an even number of horizontal pulses has been counted regardless of whether it is an odd or even field. This becomes readily apparent by referring to the composite pulse synchronization signal of FIG. 5B wherein it is shown that after an even number of horizontal pulses are counted, the next pulse synchronization signal occurs at one-half a horizontal line scan interval after the even number of horizontal pulses as shown at VS. Referring now to the composite pulse synchronization signal of FIG. 5C it can be seen that after an even number of horizontal pulses has been counted for an odd field the next succeeding pulse synchronization signal occurs after one horizontal line scan interval to provide the vertical sync signal as shown at VS.

For the non-interlace video signal, however, the vertical synchronization pulse cannot be generated upon the falling edge of the first synchronization pulse to follow the counting of the predetermined number of horizontal pulses of the horizontal pulse train H during the even field as previously discussed, but must instead be generated on the actual falling edge of the last horizontal pulse to be counted. Since the synchronization pulse separator circuit of this invention must also be compatible with the non-interlaced format, logic must be included for providing a signal indicative of whether the video format is interlaced or non-interlaced. Such an additional logic circuit to be herein described takes advantage of the fact that even fields are preceded by an even number of equalization pulses in an interval and that odd fields are preceded by an odd number of equalization pulses so that if two successive fields are recognized as being even, then it can be properly concluded that the video signal is of a non-interlace format.

Toward this end, there is provided a D flip-flop G79 having its D input terminal connected to the voltage supply VCC, its set input terminal at C connected to receive the serration pulse train S and its reset terminal R connected to receive the horizontal pulse train H. The $\bar{Q}$ output from the flip-flop 79 provides one input terminal to an AND gate G80, the other input terminal of which is connected to receive the legitimate equalization pulse train EL. The flip-flop G79 and AND gate G80 operate to gate through the second interval of equalization pulses that occur in each vertical blanking interval. The output from the AND gate G80 as shown in FIG. 5F is thereafter directed to the toggle input of a toggle flip-flop G81 which provides an output at the Q terminal thereof indicative of whether the preceding field was even or odd as a function of the number of equalization pulses detected. The flip-flop G81 is reset by the serration pulse train S in order to ensure that it starts out in the correct state. The output from the toggle flip-flop G81, in turn, is directed to the data input terminal D of a shift register G82 which is clocked at input terminal C from the output pulse signal from the pulse grabber circuit 18.

As previously discussed, the output pulse train from the pulse grabber circuit 18 represents the pulses of the low transition detector pulse train LTD following the count of predetermined number of horizontal pulses provided in the aforementioned manner by the down counters G69 through G71. Thus, the output terminal $Q_0$ of the shift register G82 provides a low (binary logic 0) signal level if the immediately preceding field is odd and a high (binary logic 1) signal level if the immediately preceding field is even. In like manner, the output terminal $Q_1$ of the shift register G82 provides a low (binary logic 0) signal level if the immediately preceding field is odd and a high (binary logic 1) signal level if the immediately preceding field is even. Thus, if the video signal provides for a non-interlaced mode of operation, the outputs from terminals $Q_1$ and $Q_0$ of the shift register G82 assume high (binary logic 1) signal levels to switch an AND gate G84 and provide a high (binary logic 1) signal level at the output therefrom which is subsequently inverted by an inverter G85. This low (binary logic 0) signal level from the inverter G85 is thereafter directed to one input terminal of an AND gate G91 and operates to inhibit the AND gate G91 from gating through the pulse train signal from the pulse grabber circuit 18 which as previously discussed is satisfactory to provide the vertical synchronization signals for the interlace mode of operation. Thus, there is provided a means for inhibiting the gating of a signal suitable for providing the vertical synchronization signal for an interlaced mode of operation when it is determined that the video signal provides for a non-interlaced mode of operation.

As previously discussed, a high (binary logic 1) signal level at the output of AND gate G84 enables an AND gate G86 to gate through the output signal received from another AND gate G87. The AND gate G87, in turn, gates through the low transition detector pulse train LTD in concert with the output signal at node N100 received from the AND gate G72 and which as previously discussed is representative of the fact that the predetermined number of horizontal pulses has been counted in the present field. Thus, the output from the AND gate G87 is a low transition detector LTD pulse whose rising edge is in alignment with the falling edge of the last of the predetermined number of horizontal pulses counted down. This signal can provide the vertical synchronization pulse for the non-interlaced mode of operation and is gated through an AND gate G86 which as previously discussed is enabled by a high (binary logic 1) signal level at its other input terminal when it has been determined that the video format does not provide for an interlace. The output from the AND gate G86, in turn, clocks a D flip-flop G89 whose D input is connected to the voltage supply VCC. The reset terminal of the flip-flop G89 is connected to the serration pulse train S so that the output at the Q terminal thereof defines a pulse that extends from the beginning of the vertical blanking interval to the first serration pulse when the video signal is in a non-interlaced mode. The output from the flip-flop G89 at the Q terminal thereof representative of the non-interlaced vertical pulse synchronization signal is gated with the output signal from the pulse grabber circuit 18 representative of the interlaced vertical synchronization signal through an OR gate G90 to provide the final output vertical synchronization signal at node N114. As will now be readily understood, if the video signal provides for an interlace format there will be provided a toggled or alternating signal level at the output node N107, while if the video signal defines a non-interlace mode, this node will maintain a steady high (binary logic 1)

signal level. Whether the video signal defines an interlace or a non-interlace mode may also be observed at the output node N114 by the duration of the vertical synchronization pulse wherein a relatively narrow pulse is indicative of an interlace mode while a relatively long pulse is indicative of a non-interlace mode. Thus, in this manner there are provided two means for determining the mode of operation.

The pulse separator circuit of this invention can operate with a wide variety of formats of video signals including even video signals which contain no equalization pulses thereby implying non-interlacing. In addition, since the pulse separator circuit does not require the detection of either legitimate equalization pulses or equalization pulses for the purpose of resetting any latch or gate or counter, the pulse separator circuit will also operate with these other types of video signal formats.

Figure 7:
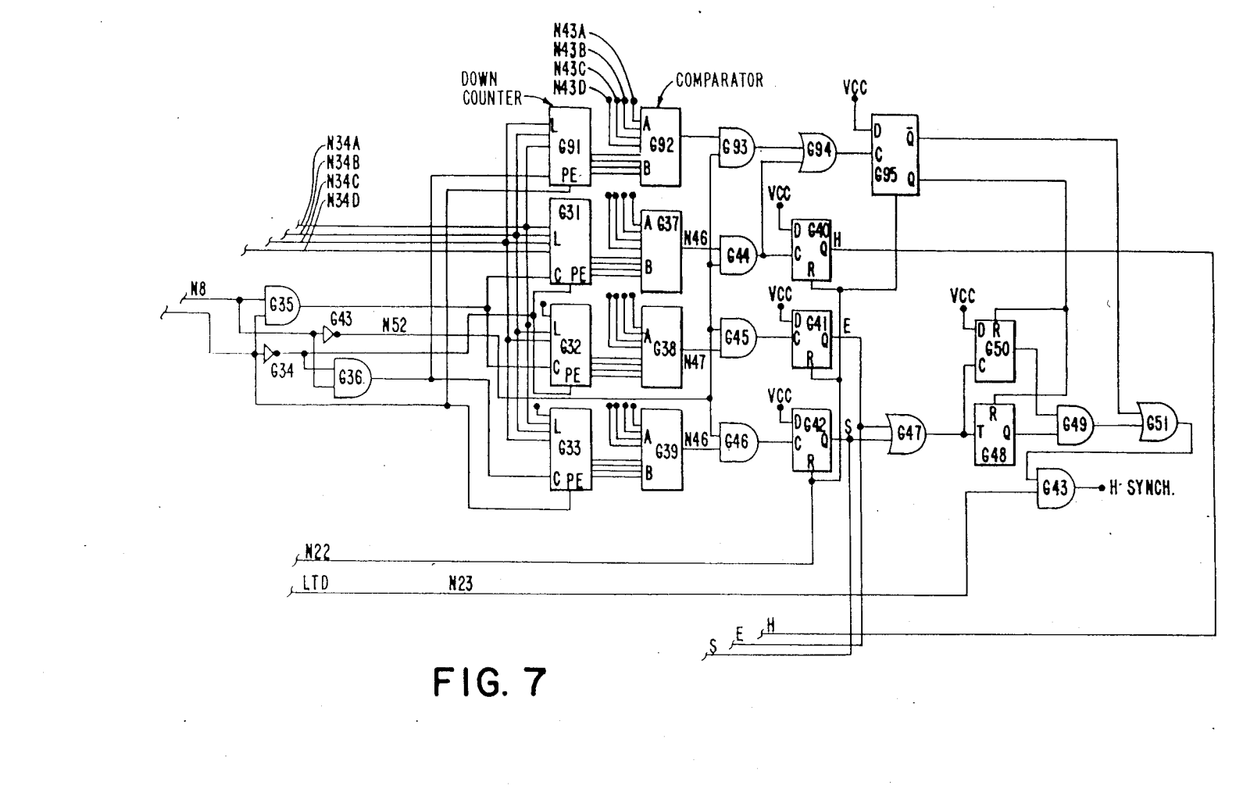
FIG. 7 is a circuit diagram of an alternate embodiment for the portion of the synchronization pulse separator circuit shown in FIG. 3.

Referring now to FIG. 7 where like numerals refer to previously described elements, there is shown an alternate embodiment for the portion of the pulse synchronization pulse separator circuit of FIG. 3 which can accommodate other video formats such as the IBM PC and Apple II formats where no equalization synchronization pulses are provided during the vertical blanking interval but only serration synchronization pulses having low durations equal to the intervals H between horizontal synchronization pulses HS. Toward this end there is provided an additional down counter G91 having a parallel load input connected to the higher order binary bits in the aforementioned manner. The output clock pulse signal from the down counter G91 is directed to the B terminal of another comparator G92 whose A input terminals are set respectively to the predetermined binary counts as previously discussed in reference to nodes N43A–N43D of FIG. 3.

Since the composite pulse synchronization signal is inverted by the inverter G34, the down counter G91 also operates to count down the clock pulses during the low periods of the composite pulse synchronization signal in the manner previously described in regard to down counter G33. Thus, the down counter G91 provides an output pulse count to the input B of the comparator G92 equivalent to the predetermined pulse count provided at input terminal A at the end of each horizontal line scan interval to thereby account for the aforementioned serration synchronization pulses wherein the low durations equal the intervals between horizontal synchronization pulses.

The output signal from the comparator G92, in turn, is directed to the input terminal of an AND gate G93, the other input terminal of which is gated by the same inverted clock pulse train that gates the AND gates G44, G45 and G46. The output from the AND gate G93, in turn, is directed to one input terminal of an OR gate G94, the other input terminal of which connects to the output of AND gate G44. The output from the OR gate G94, in turn, is directed to latch a D flip-flop G95 which is enabled by having its D input terminal connected to the positive voltage supply VCC. The flip-flop G95 also operates in the aforementioned manner to latch the output signal from the comparator G92 during the synchronization pulses of the composite pulse synchronization signal which is also the time when the down counter G91 is reloaded. The AND gate G93 operates to latch the output from the flip-flop G95 only on the falling edge of the clock pulses of the clock pulse train to prevent a false premature setting of the latch G95 as a result of any transient states which might appear at the output terminals of the comparator G92 as the counter G91 counts down. The output of the $\overline{Q}$ terminal of the flip-flop G95 connects with one input terminal of the OR gate G51 to provide the horizontal synchronization pulse train while the other output terminal Q of the flip-flop G95 connects to reset the flip-flop G48 and G50. The circuit of FIG. 7 is not only compatible with the aforementioned IBM PC and Apple II formats but is also compatible with the aforementioned RS - 170 format.

Other embodiments of the invention including additions, subtractions, deletions and other modifications of the preferred disclosed embodiments of the invention will be obvious to those skilled in the art and are within the scope of the following claims.

What is claimed is:

1. A method for separating a horizontal pulse synchronization signal and a vertical pulse synchronization signal from a composite pulse synchronization signal of a type comprising both horizontal synchronization pulses and vertical synchronization pulses which define a plurality of succeeding vertical blanking intervals, said method comprising the steps of:

determining a number of clock pulses from a clock pulse train that occur between two succeeding ones of said horizontal synchronization pulses of the composite pulse synchronization signal;

comparing said determined number of clock pulses with an actual number of the clock pulses occurring between succeeding ones of said horizontal and vertical synchronization pulses of the composite pulse synchronization signal to provide a horizontal pulse train and one signal representing only the plurality of succeeding vertical blanking intervals;

gating the horizontal pulse train with said one signal representing only the vertical blanking intervals to provide a signal determinative of the horizontal pulse synchronization signal;

determining a number of horizontal pulses of the horizontal pulse train that occur between two of succeeding ones of the vertical blanking intervals as represented by said one signal; and comparing said determined number of horizontal pulses with an actual number of the horizontal pulses of the horizontal pulse train occurring between the succeeding ones of said vertical blanking intervals to provide a signal determinative of the vertical pulse synchronization signal.

2. The process of claim 1 wherein said step of determining the number of clock pulses that occur between two succeeding ones of said horizontal synchronization pulses comprises the steps of:

determining a number of the clock pulses that occur between an initial pair of the synchronization pulses of the composite pulse synchronization signal;

storing said number of clock pulses determined in said previous step;

determining a number of said clock pulses that occur between a last pulse of a last pair of said synchronization pulses for which said clock pulses were determined and a next succeeding synchronization pulse of the composite pulse synchronization signal;

comparing the number of clock pulses determined in the preceding step with said stored number of clock pulses and storing said number of clock pulses determined in said preceding step if said number of clock pulses determined in said preceding step exceeds said stored number of clock pulses; and repeating the preceding two steps for a predetermined time to be no less than the duration of one of said vertical blanking intervals plus the time between two succeeding ones of said horizontal synchronization pulses, the last stored number of clock pulses being said determined number of clock pulses that occur between two succeeding horizontal synchronization pulses of the composite pulse synchronization signal.

3. The process of claim 1 wherein said step of comparing the determined number of clock pulses that occur between two succeeding horizontal synchronization pulses of the composite pulse synchronization signal comprise the steps of:

loading a counter with the determined number of clock pulses that occur between two succeeding ones of said horizontal synchronization pulses of the composite pulse synchronization signal; and gating the clock pulse train with the composite pulse synchronization signal to provide a gated clock pulse train to the counter so as to count down clock pulses of the gated clock pulse train provided to the counter from the determined number of clock pulses loaded into the counter to provide one of said horizontal pulses of the horizontal pulse train each time the counter counts down to a predetermined count.

4. The process of claim 1 wherein said step of determining the number of horizontal pulses of the horizontal pulse train comprises the steps of:

gating the horizontal pulses of the horizontal pulse train to a first counter after the end of a first of said two of succeeding ones of said vertical blanking intervals;

counting the gated horizontal pulses of the horizontal pulse train with the first counter; and inhibiting the gating of the horizontal pulses of the horizontal pulse train to the first counter after the start of the next of said two of succeeding ones of said vertical blanking intervals.

5. The process of claim 4 wherein said step of comparing said determined number of horizontal pulses with the actual number of horizontal pulses of the horizontal pulse train occurring between succeeding ones of said vertical blanking intervals comprises the steps of:

loading a second counter with the number of horizontal pulses of the horizontal pulse train previously counted by the first counter; and gating the horizontal pulse train to the second counter so as to count down the horizontal pulses gated to said second counter from the number of horizontal pulses loaded into said second counter in the preceding step to provide the signal which is determinative of the vertical pulse synchronization signal as a function of each time the second counter counts down to a predetermined count.

6. A method for separating a horizontal pulse synchronization signal and a vertical pulse synchronization signal from a composite pulse synchronization signal of a type comprising horizontal synchronization pulses and spaced apart intervals of serration synchronization pulses, said method comprising the steps of:

determining a number of clock pulses from a clock pulse train that occur between two succeeding ones of said horizontal synchronization pulses of the composite pulse synchronization signal;

comparing said determined number of clock pulses with an actual number of clock pulses occurring between succeeding ones of said horizontal and serration synchronization pulses of the composite pulse synchronization signal to provide a horizontal pulse train, and a serration pulse train;

gating the horizontal pulse train with the serration pulse train to provide a signal determinative of the horizontal pulse synchronization signal;

determining a number of horizontal pulses of the horizontal pulse train that occur between two succeeding ones of said intervals of serration pulses of said serration pulse train; and comparing said determined number of horizontal pulses with an actual number of horizontal pulses of the horizontal pulse train occurring between two other succeeding intervals of serration pulses to provide a signal determinative of the vertical pulse synchronization signal.

7. The process of claim 6 wherein said step of determining the number of clock pulses that occur between succeeding horizontal synchronization pulses comprises the steps of:

determining a number of the clock pulses that occur between an initial pair of said synchronization pulses of the composite synchronization signal;

storing said number of clock pulses determined in said previous step;

determining a number of said clock pulses that occur between a last pulse of a last pair of said synchronization pulses for which said clock pulses were determined and a next succeeding synchronization pulse of the composite pulse synchronization signal;

comparing the number of clock pulses determined in the preceding step with said stored number of clock pulses and storing said number of clock pulses determined in the preceding step if said number of clock pulses determined in said preceding step exceeds said stored number of clock pulses; and repeating the preceding two steps for a predetermined time to be no less than the duration of one of said intervals of serration synchronization pulses plus the time between two succeeding ones of said horizontal synchronization pulses, the last stored number of clock pulses being said determined number of clock pulses that occur between succeeding horizontal synchronization pulses of the composite pulse synchronization signal.

8. The process of claim 6 wherein the period between the succeeding ones of the serration synchronization pulses is substantially one-half the period between the succeeding ones of the horizontal synchronization pulses nnd said step of comparing the determined number of clock pulses that occur between two succeeding ones of said horizontal synchronization pulses of the composite synchronization signal comprise the steps of:

loading a first counter with the determined number of clock pulses that occur between two succeeding ones of said horizontal synchronization pulses of the composite pulse synchronization signal;

loading a second counter with substantially one-half of the determined number of clock pulses that occur between two succeeding ones of said horizontal synchronization pulses of the composite pulse synchronization signal; and gating the clock pulse train with the composite pulse synchronization signal to provide a gated clock pulse train to the first and second counters so as to count down clock pulses of the gated clock pulse train provided to the first and second counters respectively from the determined number of clock pulses loaded in the first counter and from substantially one-half the determined number of clock pulses loaded in the second counter to provide respectively one of said horizontal pulses of the horizontal pulse train each time the first counter counts down to a predetermined count and one of said serration pulses of the serration pulse train each time the second counter counts down to a predetermined count.

9. The process of claim 8 wherein the composite pulse synchronization signal comprises the spaced apart intervals of serration synchronization pulses each disposed between a leading and trailing interval of equalization synchronization pulses and the period between individual serration synchronization pulses is substantially the same as the period between individual equalization synchronization pulses and wherein said step of comparing the determined number of clock pulses that occur between two succeeding ones of said horizontal synchronization pulses of the composite synchronization signal comprise the additional steps of:

loading a third counter with substantially one-half the determined number of clock pulses that occur between two succeeding ones of said horizontal synchronization pulses of the composite synchronization signal; and gating the clock pulse train with an inverted composite pulse synchronization signal to provide a gated clock pulse train to the third counter so as to count down clock pulses of the gated clock pulse train provided to the third counter from the substantially one-half the determined number of clock pulses loaded into the third counter to provide one of said equalization synchronization pulses each time the third counter counts down to a predetermined count so as to define an equalization pulse train.

10. The process of claim 9 wherein the step of gating the horizontal pulse train with the serration pulse train comprises the steps of:

gating the equalization and serration pulse trains in a manner to provide a combined equalization and serration pulse train output;

toggling a circuit with the combined equalization and serration pulse train output to provide an output signal having substantially one-half the frequency of the combined equalization and serration pulse train output; and gating the output signal from the circuit with the horizontal pulse train to provide the signal which is determinative of the horizontal pulse synchronization signal.

11. The process of claim 9 wherein the composite pulse synchronization signal comprises either non-interlaced even fields or odd and even interlaced fields with each odd field preceded by an interval of odd ones of said equalization pulses and each even field preceded by an interval of even ones of said equalization pulses wherein said step of determining the number of horizontal pulses of the horizontal pulse train that occur between succeeding intervals of the equalization pulses comprises the steps of:

determining a legitimate equalization pulse train by deleting those ones of said equalization pulses from the equalization pulse train that coincide with the horizontal pulses of the horizontal pulse train;

determining whether the intervals of legitimate equalization pulses contain an odd or even number of equalization pulses;

enabling a logic gate upon the determination of an even number of said equalization pulses to gate the horizontal pulse train through the logic gate;

limiting the time that the logic gate is enabled to gate through the horizontal pulse train so as not to exceed the time interval between two succeeding intervals of the legitimate equalization pulses; and counting up the number of horizontal pulses of the horizontal pulse train gated through the logic gate with a fourth counter.

12. The process of claim 11 wherein said step of comparing said determined number of horizontal pulses with the actual number of horizontal pulses of the horizontal pulse train comprises the steps of:

loading a fifth counter with the number of horizontal pulses of the horizontal pulse train previously counted up by the fourth counter;

directing the horizontal pulse train to the fifth counter so as to count down the horizontal pulses of the horizontal pulse train directed to the fifth counter from the number of horizontal pulses loaded into the fifth counter to provide an output pulse train signal as a function of the fifth counter counting down to a predetermined count;

providing a low transition detector pulse train by clocking a first pulse grabber circuit with the composite pulse synchronization signal;

gating said output pulse train signal from the fifth counter to enable a second pulse grabber circuit;

clocking the second pulse grabber circuit with the low transition detection pulse train to provide an output signal;

setting a latch as a function of the serration pulses of the serration pulse train and resetting the latch as a function of the horizontal pulses of the horizontal pulse train;

gating the legitimate equalization pulse train as a function of the output of the latch to provide an output pulse train signal comprising only those intervals of the equalization pulses succeeding intervals of the serration pulses;

determining from the output pulse train produced by the gating of the legitimate equalization pulse train whether the last two fields were even or odd; and gating the output signal from the second pulse grabber circuit to provide the signal which is determinative of the vertical pulse synchronization signal upon the finding that the last two fields are even and odd respectively and gating the low transition pulse train with the output pulse train signal from the fifth counter to provide the signal which is determinative of the vertical pulse synchronization signal upon the finding that the last two fields are even.

13. A synchronization pulse separator circuit for separating a horizontal pulse synchronization signal and a vertical pulse synchronization signal from a composite pulse synchronization signal of the type which comprises both horizontal synchronization pulses and vertical synchronization pulses which define a plurality of succeeding vertical blanking intervals, said circuit comprising:

means for determining a number of clock pulses from a clock pulse train that occur between two succeeding ones of said horizontal synchronization pulses of the composite pulse synchronization signal;

means for comparing said determined number of clock pulses with an actual number of the clock pulses occurring between succeeding ones of said horizontal and vertical synchronization pulses of the composite pulse synchronization signal to provide a horizontal pulse train and one signal representing only the plurality of succeeding vertical blanking intervals;

means for gating the horizontal pulse train with said one signal representing only the vertical blanking intervals to provide a signal determinative of the horizontal pulse synchronization signal;

means for determining a number of horizontal pulses of the horizontal pulse train that occur between two of succeeding ones of the vertical blanking intervals as represented by said one signal; and means for comparing said determined number of horizontal pulses with an actual number of the horizontal pulses of the horizontal pulse train occuring between the succeeding ones of said vertical blanking intervals to provide a signal determinative of the vertical pulse synchronization signal.

14. The pulse separator circuit of claim 13 wherein said means for determining the number of clock pulses that occur between two succeeding ones of said horizontal synchronization pulses comprises:

means for counting a number of the clock pulses that occur between succeeding ones of said synchronization pulses of the composite pulse synchronization signal;

means for thereafter latching the number of clock pulses so counted in response to a select control signal;

means for comparing the number of clock pulses last counted by said counting means with the number of clock pulses last latched by said latching means and providing said select control signal to said latching means when the number of clock pulses last counted by said counting means exceeds the number of clock pulses last latched by said latching means; and means for gating the clock pulse train and composite pulse synchronization signal to said counting means for a time interval no less than the duration of one of ther vertical blanking intervals plus the time between two succeeding ones of the horizontal synchronization pulses, said last latched number of clock pulses being said determined number of clock pulses that occur between horizontal synchronization pulses of the composite pulse synchronization signal.

15. The pulse separator circuit of claim 14 wherein said means for comparing said determined number of clock pulses with an actual number of clock pulses occurring between succeeding ones of said horizontal and vertical synchronization pulses of the composite pulse synchronization signal comprise:

a counter for receiving the determined number of clock pulses that occur between two succeeding ones of said horizontal synchronization pulses of the composite synchronization signal; and means for gating the clock pulse train with the composite pulse synchronization signal to provide a gated clock pulse train to said counter so as to enable said counter to count down clock pulses of the gated clock pulse train provided to the counter from said determined number of clock pulses received by said counter, said counter operating to provide one of said horizontal pulses of the horizontal pulse train each time said counter counts down to a predetermined count.

16. The pulse separator circuit of claim 14 wherein said means for determining the number of horizontal pulses of the horizontal pulse train that occur between two succeeding ones of said vertical blanking intervals of the vertical blanking interval signal comprise:

a first counter;

means for gating the horizontal pulses of the horizontal pulse train to said first counter after the end of a first of said two of succeeding ones of said vertical blanking intervals to enable said first counter to count the gated horizontal pulses of the horizontal pulse train; and means for inhibiting the gating of the horizontal pulses of the horizontal pulse train to said first counter after the start of the next of said two of succeeding ones of said vertical blanking intervals.

17. The pulse separator circuit of claim 16 wherein said means for comparing said determined number of horizontal pulses with the actual number of horizontal pulses of the horizontal pulse train occurring between successive ones of said vertical blanking intervals comprises:

a second counter;

means for loading the second counter with the number of horizontal pulses of the horizontal pulse train previously counted by the first counter; and means for gating the horizontal pulse train to the second counter so as to count down the number of horizontal pulses of the horizontal pulse train gated to said second counter from the number of horizontal pulses loaded into said second counter to provide the signal which is determinative of the vertical pulse synchronization signal as a function of each time the second counter counts down to a predetermined count.

18. A synchronization pulse separator circuit for separating a horizontal pulse synchronization signal and a vertical pulse synchronization signal fron a composite pulse synchronization signal of a type which comprises horizontal synchronization pulses and spaced apart intervals of serration synchronization pulses, said circuit comprising:

means for determining a number of clock pulses from a clock pulse train that occur between two succeeding ones of said horizontal synchronization pulses of the composite pulse syychronization signal;

means for comparing said determined number of clock pulses with an actual number of clock pulses occurring between succeeding ones of said horizontal and serration synchronization pulses of the composite pulse synchronization signal to provide a horizontal pulse train and a serration pulse train;

means for gating the horizontal pulse train with the serration pulse train to provide a signal determinative of the horizontal pulse synchronization signal;

means for determining a number of horizontal pulses of the horizontal pulse train that occur between two succeeding ones of said intervals of serration pulses of said serration pulse train; and means for comparing said determined number of horizontal pulses with an actual number of horizontal pulses of the horizontal pulse train occuring between two other succeeding intervals of serration pulses to provide a signal determinative of the vertical pulse synchronization signal.

19. The pulse separator circuit of claim 18 wherein said means for determining the number of clock pulses that occur between two succeeding horizontal synchronization pulses comprises:

means for counting a number of the clock pulses that occur between succeeding ones of said synchronization pulses of the composite pulse synchronization signal;

means for thereafter latching the number of clock pulses so counted in response to a select control signal;

means for comparing the number of clock pulses last counted by said counting means with the number of clock pulses last latched by said latching means and providing said select control signal to said latching means when the number of clock pulses last counted by said counting means exceeds the number of clock pulses last latched by said latching means; and means for gating the clock pulse train and composite synchronization signal to said counting means for a time interval no less than the duration of an interval of the serration synchronization pulses plus the time between two succeeding ones of the horizontal synchronization pulses, said last latched number of clock pulses being said determined number of clock pulses that occur between the horizontal synchronization pulses of the composite synchronization signal.

20. The pulse separator circuit of claim 18 wherein the period between the succeeding ones of the serration synchronization pulses is substantially one-half the period between the succeeding ones of the horizontal synchronization pulses and said means for comparing said determined number of clock pulses with the actual number of clock pulses occuring between succeeding ones of said horizontal synchronization pulses of the composite pulse synchronization signal comprises:

a first counter for receiving the determined number of clock pulses that occur between two succeeding ones of said horizontal synchronization pulses of the composite pulse synchronization signal;

a second counter for receiving substantially one-half the determined number of clock pulses that occur between two succeeding ones of said horizontal synchronization pulses of the composite pulse synchronization signal;

first means for gating the clock pulse train with the composite pulse syncrhonization signal to provide a gated clock pulse train to said first and second counters so as to enable said first and second counters respectively to count down clock pulses of the gated clock pulse train provided to the first and second counters respectively from the determined number of clock pulses loaded in the first counter and from substantially one-half the determined number of clock pulses loaded in the second counter to provide respectively one of said horizontal pulses of the horizontal pulse train each time the first counter counts down to a predetermined count and one of said serration pulses of the serration pulse train each time the second counter counts down to a predetermined count.

21. The pulse separator circuit of claim 20 wherein the composite pulse sychronization signal comprises the spaced apart intervals of serration synchronization pulses each disposed between a leading and trailing interval of equalization synchronization pulses and the period between individual serration synchronization pulses is substantially the same as the period between individual equalization synchronization pulses and said means for comparing said determined number of clock pulses with the actual number of clock pulses occurring between succeeding ones of said synchronization pulses of the composite pulse synchronization signal comprises:

a third counter for receiving substantially one-half the determined number of clock pulses that occur between two succeeding ones of said horizontal synchronization pulses of the composite synchronization signal; and second means for gating the clock pulse train with an inverted composite pulse synchronization signal to provide a gated clock pulse train to the third counter so as to count down clock pulses of the gated clock pulse train provided to the third counter from the substantially one-half the determined number of clock pulses loaded into the third counter to provide one of said equalization synchronization pulses each time the third counter counts down to a predetermined count so as to define an equalization pulse train.

22. The pulse separation circuit of claim 21 wherein said means for gating the horizontal pulse train with the serration pulse train comprises:

a first or gate for receiving the equalization and serration pulse trains and providing a combined equalization and serration pulse train output;

a toggle flip-flop for receiving the combined equalization and serration pulse train output and providing an output signal having substantially one-half the frequency of the combined equalization and serration pulse train; and a second or gate for receiving said output signal from said toggle flip-flop and said horizontal pulse train to provide the signal which is determinative of the horizontal pulse synchronization signal.

23. The synchronization pulse separator circuit of claim 22 wherein the composite pulse synchronization signal comprises either non-interlaced even fields or odd and even interlaced fields with each odd field preceded by an interval of odd ones of said equalization pulses and each even field preceded by an interval of even ones of said equalization pulses and said means for determining the number of horizontal pulses of the horizontal pulse train that occur between succeeding intervals of the equalization pulses comprises:

means for determining a legitimate equilization pulse train by deleting those ones of said equalization pulses from the equalization pulse train that coincide with the horizontal pulses of the horizontal pulse train;

means for determining whether the intervals of legitimate equalization pulses contain an odd or even number of equalization pulses;

a logic connected to receive the horizontal pulse train;

means for enabling said logic gate upon the determination of an even number of the equalization pulses to gate through the horizontal pulse train and limiting the time said logic gate is enabled to gate through the horizontal pulse train so as not to exceed the time interval between two succeeding intervals of legitimate equalization pulses; and a fourth counter for counting up the number of horizontal pulses of the horizontal pulse train gated through the logic gate.

24. The synchronization pulse separation circuit of claim 23 wherein said means of comparing said determined number of horizontal pulses with the actual number of horizontal pulses of the horizontal pulse train occurring between succeeding intervals of equalization pulses comprises:

a fifth counter;

means for loading said fifth counter with the number of horizontal pulses of the horizontal pulses train previously counted up by said fourth counter;

means for directing the horizontal pulse train to said fifth counter so as to count down the horizontal pulses from the horizontal pulse train directed to the fifth counter from the number of horizontal pulses loaded into the fifth counter to provide an output pulse train signal as a function of said fifth counter counting down to a predetermined count;

a first pulse grabber circuit responsive to the composite pulse synchronization signal for providing a low transition detector pulse train;

a second pulse grabber circuit responsively enabled by said output pulse train signal from said fifth counter and clocked by the low transition detecting pulse train from said first pulse grabber circuit to provide an output signal;

a latch connected to be set in response to the serration pulses of the serration pulse train and reset as a function of the horizontal pulses of the horizontal pulse train;

means for gating the legitimate equalization pulse train as a function of the output of said latch to provide an output pulse train signal comprising only those intervals of the equalization pulses succeeding intervals of the serration pulses;

means for determining from the output pulse train signal from said means for gating the legitimate equalization pulse train as a function of the output of said latch, regardless of whether the last two fields are even or odd; and means for gating the output signal from said second pulse grabber circuit to provide the signal which is determinative of the vertical pulse synchronization signal upon the finding that the last two fields are even and odd respectively and gating the low transition pulse train with the output pulse train signal from said fifth counter to provide the signal which is determinative of the vertical pulse synchronization signal upon the finding that the last two fields are even.

* * * * *